Feb. 20, 1934.    G. J. LIPSCOMB    1,947,785
WEED CUTTER
Filed June 29, 1933

Inventor
Gaston J. Lipscomb.
By
his Attorneys

Patented Feb. 20, 1934

1,947,785

UNITED STATES PATENT OFFICE 1,947,785

WEED CUTTER

Gaston J. Lipscomb, Montclair, N. J.

Application June 29, 1933. Serial No. 678,280

6 Claims. (Cl. 55—65)

The present invention relates to weed cutting implements and similar devices and aims generally to improve existing implements for cutting weeds from the soil. Among the primary aims and objects of the invention is the provision of a simple and desirable weed cutter which may be extremely cheap in its cost of construction while efficient in its operation.

One embodiment of my invention is illustrated in the accompanying drawing wherein Fig. 1 is an elevation of the implement as a whole;

Figure 1:
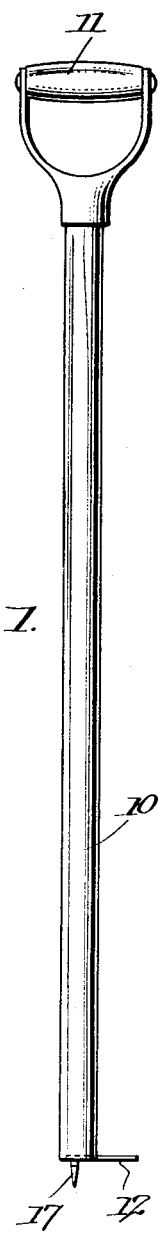
Figure 2:
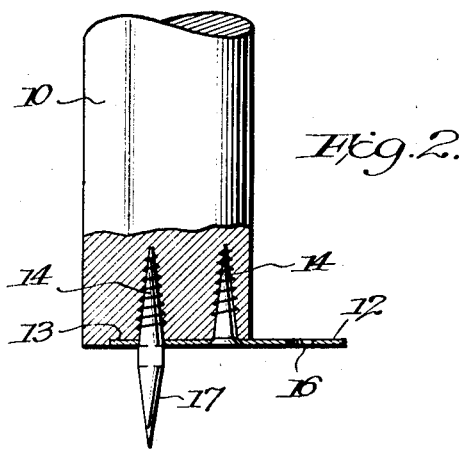
Fig. 2 is an enlarged detailed sectional view of the cutting end of the implement.

In the preferred embodiment of the invention as illustrated in the drawing a suitable shaft 10 of desired length, preferably a long shaft, is provided at one end with a handle grip 11 and at its opposite end with a relatively thin horizontally disposed cutting blade 12 having a substantial portion thereof projecting laterally from the shaft 10.

In order that the cutting blade 12 may be rigidly and non-rotatably secured to the shaft 10, the lower end of the shaft is preferably provided with a rectangularly shaped recess 13 of a size and depth to accommodate one end portion of the cutting blade 12. The cutting blade 12 is advantageously rigidly secured to the end of the shaft by means of one or more fastening elements such as screws 14.

Figure 3:
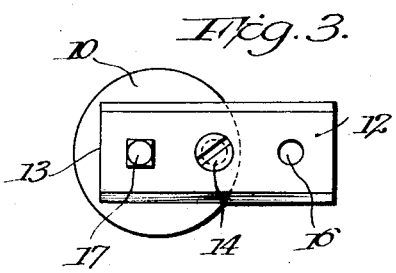
Fig. 3 is a bottom plan view thereof.
Figure 4:
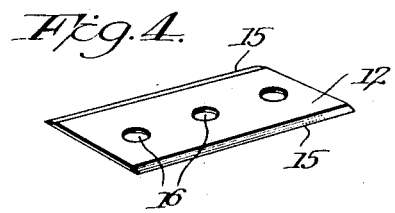
Fig. 4 is a detailed view of the blade.

The cutting blade 12 is advantageously a double edged blade as shown in Figs. 3 and 4, having oppositely disposed sharpened edges 15, and preferably is provided with a plurality of spaced openings 16. In the illustrated form three spaced openings are provided, the central opening being disposed centrally of the blade and the end openings being equi-distant from the central opening. This permits the blade to be readily reversed in its position on the end of the shaft so that when one end portion becomes too dull to be readily effective, the blade may be readily removed and reversed with respect to the shaft.

One of the fastening elements 14 is provided with a head in the form of an elongated tapered or pointed end 17. Preferably the fastening screw 14 that is provided with a pointed head 17 is disposed axially of the shaft and when inserted in the ground or soil, serves as a pivot about which the shaft and cutter may be rotated.

In use, the shaft is placed adjacent the weed to be removed from the soil and the pointed end 17 inserted in the ground. By rotating the shaft and cutter about the axis of the pointed end 17, the weed is readily cut from the soil. When one end portion of the cutting blade becomes dull, it may be easily reversed as to its position with respect to the shaft by simply removing the fastening members 14 and reversing the blade, the positioning openings of the blade being symmetrically disposed to receive the fastening screws 14 when replaced in their original position.

The improved implement is extremely easy to operate as the operator may use it in a standing position and may effectively cut weeds from the soil at a very rapid rate. The steel cutting blade being thin and sharp, the weeds may be easily cut without mutilation of the ground and lawn.

Having described one preferred embodiment of the invention, what I claim as new and desire to secure by Letters Patent is:

1. A weed cutting implement of the character described comprising a handle shaft, a flat horizontally disposed thin metal cutting blade non-rotatably secured to the lower end of the shaft and projecting laterally therefrom to be positioned close and parallel to the ground, and a pointed pivot member depending from said blade, axially of said shaft, and adapted to be inserted in the soil to provide a pivot member about which said cutter may be rotated.

2. A weed cutting implement of the character described comprising a handle, a flat rectangular thin metal cutting blade recessed into the lower end of said handle and secured thereto against relative rotative movement, a plurality of separate and removable fastening means for securely fastening said cutting blade to said handle, one of said fastening means being formed with a pointed end extending beyond the cutting blade and adapted to be inserted in the soil to serve as a pivot about which said blade may be rotated.

3. A weed cutter comprising a handle member, a thin metal double-edged cutting blade rigidly secured to the one end of the shaft, means for reversibly securing the blade to the shaft, and a pointed member extending beyond the blade and parallel to the shaft and serving as a pivot about which said blade may be rotated.

4. A weed cutter comprising a shaft, a thin metal double-edge cutting blade, spaced fastening elements for securing said blade to the shaft, said blade being provided with a plurality of symmetrically disposed positioning openings adapted to recess said fastening means whereby said blade may be reversibly attached to said shaft.

5. A weed cutter comprising a shaft, a thin metal double-edge cutting blade, spaced fastening elements for securing said blade to the shaft, said blade being provided with a plurality of equidistantly spaced openings adapted to recess said fastening means whereby said blade may be reversibly attached to said shaft.

6. A weed cutter comprising a shaft, a thin metal double-edge cutting blade, spaced fastening elements for securing said blade to the shaft, said blade being provided with a plurality of equidistantly spaced openings adapted to recess said fastening means whereby said blade may be reversibly attached to said shaft, one of said fastening means providing an elongated pointed end adapted to be readily inserted in the soil to serve as a pivot about which said blade may be reversed.

GASTON J. LIPSCOMB.